(12) United States Patent
Zhang et al.

(10) Patent No.: US 11,921,228 B2
(45) Date of Patent: *Mar. 5, 2024

(54) RADAR SYSTEM WITH MODIFIED ORTHOGONAL LINEAR ANTENNA SUBARRAYS

(71) Applicant: Aptiv Technologies Limited, St. Michael (BB)

(72) Inventors: Yu Zhang, Thousand Oaks, CA (US); Le Zheng, Monterey Park, CA (US); Zhengzheng Li, Agoura Hills, CA (US); Xin Zhang, Agoura Hills, CA (US)

(73) Assignee: Aptiv Technologies Limited, St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 18/173,362

(22) Filed: Feb. 23, 2023

(65) Prior Publication Data

US 2023/0204713 A1 Jun. 29, 2023

Related U.S. Application Data

(63) Continuation of application No. 17/075,632, filed on Oct. 20, 2020, now Pat. No. 11,619,705.

(51) Int. Cl.
*G01S 7/03* (2006.01)
*G01S 13/42* (2006.01)
(Continued)

(52) U.S. Cl.
CPC ............ *G01S 7/032* (2013.01); *G01S 13/426* (2013.01); *G01S 13/931* (2013.01); *G01S 2013/0263* (2013.01)

(58) Field of Classification Search
CPC ...... G01S 7/032; G01S 13/426; G01S 13/931; G01S 2013/0263; G01S 13/42;
(Continued)

(56) References Cited

U.S. PATENT DOCUMENTS 5,657,027 A  8/1997  Guymon
7,474,262 B2  1/2009  Alland
(Continued)

FOREIGN PATENT DOCUMENTS

CN  106772224 A  5/2017
CN  111239678 A  6/2020
(Continued)

OTHER PUBLICATIONS

"Extended European Search Report", EP Application No. 20155495.3, dated Aug. 7, 2020, 11 pages.
(Continued)

*Primary Examiner* — Bernarr E Gregory
*Assistant Examiner* — Yonghong Li
(74) *Attorney, Agent, or Firm* — Harness, Dickey & Pierce, P.L.C.

(57) ABSTRACT

This document describes techniques and systems of a radar system with modified orthogonal linear antenna subarrays and an angle-finding module. The described radar system includes a first one-dimensional (1D) (e.g., linear) subarray; a second 1D subarray positioned orthogonal to the first 1D subarray; and a two-dimensional (2D) subarray. Using electromagnetic energy received by the first 1D subarray and the second 2D subarray, azimuth angles and elevation angles associated with one or more objects can be determined. The radar system associates, using electromagnetic energy received by the 2D subarray, pairs of an azimuth angle and an elevation angle to the respective objects. In this way, the described systems and techniques can reduce the number of
(Continued)

antenna elements while maintaining the angular resolution of a rectangular 2D array with similar aperture sizing.

20 Claims, 7 Drawing Sheets (51) Int. Cl.
*G01S 13/931* (2020.01)
*G01S 13/02* (2006.01)

(58) Field of Classification Search
CPC ......... G01S 7/02; G01S 7/2813; H01Q 21/00; H01Q 1/22; H01Q 1/3233; H01Q 21/061
See application file for complete search history.

(56) References Cited

U.S. PATENT DOCUMENTS

| | | | |
|---|---|---|---|
| 7,639,171 | B2 | 12/2009 | Alland et al. |
| 8,085,183 | B2 | 12/2011 | Hildebrandt et al. |
| 8,310,402 | B2 | 11/2012 | Yang |
| 9,395,727 | B1 | 7/2016 | Smith et al. |
| 9,869,762 | B1 | 1/2018 | Alland et al. |
| 9,958,527 | B2 | 5/2018 | Tuxen |
| 10,042,050 | B2 | 8/2018 | Mersseman et al. |
| 10,416,680 | B2 | 9/2019 | Li et al. |
| 10,446,923 | B2 | 10/2019 | Watson |
| 10,620,305 | B2 | 4/2020 | Cornic et al. |
| 10,809,737 | B2 | 10/2020 | Li et al. |
| 10,866,304 | B1 | 12/2020 | Hassibi et al. |
| 10,996,330 | B2 | 5/2021 | Meyer et al. |
| 11,415,664 | B2 | 8/2022 | Hammes et al. |
| 11,619,705 | B2 | 4/2023 | Zhang et al. |
| 11,635,506 | B2 | 4/2023 | Iwasa et al. |
| 2009/0289833 | A1* | 11/2009 | Johnson ............... H01Q 21/061 342/179 |
| 2011/0163909 | A1 | 7/2011 | Jeong |
| 2011/0267217 | A1 | 11/2011 | Hildebrandt et al. |
| 2012/0086604 | A1 | 4/2012 | Yang |
| 2013/0063306 | A1 | 3/2013 | Yang |
| 2014/0218259 | A1 | 8/2014 | Lee et al. |
| 2014/0266868 | A1 | 9/2014 | Schuman |
| 2016/0033640 | A1 | 2/2016 | Mersseman et al. |
| 2017/0149147 | A1 | 5/2017 | Minami et al. |
| 2017/0363713 | A1 | 12/2017 | Kim |
| 2017/0365924 | A1 | 12/2017 | Topak |
| 2018/0149736 | A1* | 5/2018 | Alland ............... H01Q 21/28 |
| 2019/0285738 | A1* | 9/2019 | Iwasa ............... G01S 13/003 |
| 2019/0324133 | A1 | 10/2019 | Hong et al. |
| 2019/0386712 | A1 | 12/2019 | Fang |
| 2020/0004262 | A1 | 1/2020 | Li et al. |
| 2020/0112086 | A1 | 4/2020 | Kim et al. |
| 2020/0256947 | A1* | 8/2020 | Motoda ............... G01S 7/352 |
| 2020/0309899 | A1 | 10/2020 | Jonas et al. |
| 2021/0239791 | A1 | 8/2021 | Vollbracht et al. |
| 2021/0239821 | A1 | 8/2021 | Vollbracht et al. |
| 2021/0373144 | A1 | 12/2021 | Amani et al. |
| 2022/0163623 | A1 | 5/2022 | Kishigami et al. |
| 2022/0236370 | A1 | 7/2022 | Li et al. |

FOREIGN PATENT DOCUMENTS

| | | |
|---|---|---|
| DE | 102004046634 A1 | 3/2006 |
| DE | 102017221049 A1 | 5/2018 |
| DE | 102017223429 A1 | 7/2018 |
| EP | 2662699 A1 | 11/2013 |
| EP | 3605135 A1 | 2/2020 |
| EP | 3757607 A1 | 12/2020 |
| EP | 3204788 B1 | 3/2022 |
| EP | 4036600 A1 | 8/2022 |
| EP | 4043919 A1 | 8/2022 |
| JP | 6523350 B2 | 5/2019 |
| JP | 2020186972 A | 11/2020 |
| WO | 2014150908 A1 | 9/2014 |
| WO | 2017148561 A1 | 9/2017 |
| WO | 2020007573 A1 | 1/2020 |
| WO | 2021096889 A1 | 5/2021 |

OTHER PUBLICATIONS

"Extended European Search Report", EP Application No. 20155499.5, dated Aug. 7, 2020, 11 pages.
"Extended European Search Report", EP Application No. 20155503.4, dated Jul. 24, 2020, 9 pages.
"Extended European Search Report", EP Application No. 20213050.6, dated May 25, 2021, 11 pages.
"Extended European Search Report", EP Application No. 22197753.1, dated Mar. 7, 2023, 17 pages.
"FR5CPEC Radar sensor for vehicular use Teardown Internal Photos Robert Bosch GmbH", Retrieved at: https://fccid.io/NF3FR5CPEC/Internal-Photos/internal-Photos-4041421, Oct. 10, 2018, 6 pages.
Trummer, "A Polarimetric 76-79 GHz Radar-Frontend for Target Classification in Automotive Use", Oct. 2016, 4 pages.
Zhang, et al., "Flexible Array Response Control via Oblique Projection", IEEE Transactions on Signal Processing, vol. 67, No. 12, Jun. 15, 2019, pp. 3126-3139.
"Extended European Search Report", EP Application No. 21196393.9, dated Feb. 28, 2022, 11 pages.
"Extended European Search Report", EP Application No. 21196394.7, dated Mar. 4, 2022, 11 pages.
"Extended European Search Report", EP Application No. 21215410.8, dated Jul. 12, 2022, 9 pages.
"Extended European Search Report", EP Application No. 21216322.4, dated Jun. 3, 2022, 9 pages.
Amin, et al., "Sparse Arrays and Sampling for Interference Mitigation and DOA Estimation in GNSS" Proceedings of the IEEE, vol. 104, No. 6, Jun. 2016, pp. 1302-1317.
Chen, et al., "A new method for joint DOD and DOA estimation in bistatic MIMO radar", Feb. 2010, pp. 714-718.
Engels, et al., "Automotive MIMO Radar Angle Estimation in the Presence of Multipath", Oct. 2017, 5 pages.
Feger, et al., "A 77-GHz FMCW MIMO Radar Based on an SiGe Single-Chip Transceiver", IEEE Transactions on Microwave Theory and Techniques, vol. 57, No. 5, May 2009, pp. 1020-1035.
Gu, et al., "Adaptive Beamforming via Sparsity-Based Reconstruction of Covariance Matrix", Compressed Sensing in Radar Signal Processing, 2019, 33 pages.
Gu, et al., "Joint SVD of Two Cross-Correlation Matrices to Achieve Automatic Pairing in 2-D Angle Estimation Problems", IEEE Antennas and Wireless Propagation Letters, vol. 6, pp. 553-556, Feb. 2007, 4 pages.
Gu, et al., "Robust Adaptive Beamforming Based on Interference Covariance Matrix Reconstruction and Steering Vector Estimation", IEEE Transactions on Signal Processing, vol. 60, No. 7, Jul. 2012, pp. 3881-3885.
Gu, et al., "Robust Adaptive Beamforming Based on Interference Covariance Matrix Sparse Reconstruction", Signal Processing, vol. 96, Mar. 1, 2014, pp. 375-381.
Haardt, et al., "Unitary ESPRIT: How to Obtain Increased Estimation Accuracy with a Reduced Computational Burden", May 1995, 1232-1242.
Jiang, et al., "Joint DOD and DOA Estimation for Bistatic MIMO Radar in Unknown Correlated Noise", Nov. 2015, pp. 5113-5125.
Jin, et al. "Joint DOD and DOA estimation for bistatic MIMO radar", Feb. 2009, pp. 244-251.
Kikuchi, et al., "Pair-Matching Method for Estimating 2-D Angle of Arrival With a Cross-Correlation Matrix", IEEE Antennas and Wireless Propagation Letters, vol. 5, pp. 35-40, Mar. 2006, 6 pages.
Moffet, "Minimum-Redundancy Linear Arrays", IEEE Transactions on Antennas and Propagation, vol. AP-16, No. 2., Mar. 1968, pp. 172-175.
Pursuant to MPEP § 2001.6(b) the applicant brings the following co-pending application to the Examiner's attention: U.S. Appl. No. 17/075,632.

(56) References Cited

OTHER PUBLICATIONS

Razavi-Ghods, "Characterisation of MIMO Radio Propagation Channels", Durham theses, Durham University. Available at Durham E-Theses Online: http://etheses.dur.ac.uk/2526/ (Year: 2007), 349 pages.

Roy, et al., "ESPRIT—Estimation of Signal Parameters Via Rotational Invariance Techniques", Jul. 1989, pp. 984-995.

Steinwandt, et al., "Performance Analysis of ESPRIT—Type Algorithms for Co-Array Structures", Dec. 10, 2017, 5 pages.

Sun, et al., "MIMO Radar for Advanced Driver-Assistance Systems and Autonomous Driving: Advantages and challenges", Jul. 2020, pp. 98-117.

Tropp, et al., "Signal Recovery From Random Measurements Via Orthogonal Matching Pursuit", IEEE Transactions on Information Theory, vol. 53, No. 12, Dec. 2007, pp. 4655-4666, Dec. 2007, 12 pages.

Vaidyanathan, et al., "Sparse Sensing with Co-Prime Samplers and Arrays", IEEE Trans. Signal Process., vol. 59, No. 2, Feb. 2011, pp. 573-586.

Van Trees, "Planar Arrays and Apertures", Essay in "Detection, Estimation, and Modulation Theory, Optimum Array Processing", pp. 231-274. Wiley-Interscience, May 2002, 44 pages.

Visentin, et al., "Analysis of Multipath and DOA Detection Using a Fully Polarimetric Automotive Radar", Apr. 2018, 8 bages.

Wang, et al., "Two-Dimensional Beamforming Automotive Radar with Orthogonal Linear Arrays", 2019 IEEE Radar Conference, Boston, MA, Apr. 22-26, 2019., 6 pages.

Yu, et al., "MIMO Adaptive Beamforming for Nonseparable Multipath Clutter Mitigation", IEEE Transactions on Aerospace and Electronic Systems, vol. 50, No. 4, Oct. 2014, pp. 2604-2618.

Zhou, et al., "A Robust and Efficient Algorithm for Coprime Array Adaptive Beamforming", IEEE Transactions on Vehicular Technology, vol. 67, No. 2, Feb. 2018, pp. 1099-1112.

Zoltowski, et al., "Closed-Form 2-D Angle Estimation with Rectangular Arrays in Element Space or Beamspace via Unitary ESPRIT", Feb. 1996, pp. 316-328.

Zoltowski, et al., "ESPRIT-Based 2-D Direction Finding with a Sparse Uniform Array of Electromagnetic Vector Sensors", Aug. 1, 2000, pp. 2195-2204.

"Extended European Search Report", EP Application No. 23165460.9, dated Sep. 15, 2023, 16 pages.

"Extended European Search Report", EP Application No. 22200994.6, dated Aug. 11, 2023, 15 pages.

"Extended European Search Report", EP Application No. 23158330.3, dated Aug. 25, 2023, 17 pages.

Wu, et al., "A Low Complexity Adaptive Algorithm for Eigenspace-Based Two-Dimensional Direction of Arrival Tracking", IEICE Transactions on Fundamentals of Electronics, Communications and Computer Sciences, vol. E92-A, No. 8, Aug. 1, 2019, pp. 2097-2106.

\* cited by examiner

RADAR SYSTEM WITH MODIFIED ORTHOGONAL LINEAR ANTENNA SUBARRAYS

CROSS-REFERENCE TO RELATED APPLICATION

This application is a continuation of U.S. patent application Ser. No. 17/075,632, filed Oct. 20, 2020, the disclosure of which is incorporated by reference herein in its entirety.

BACKGROUND

Radar systems use antennas to transmit and receive electromagnetic (EM) signals for detecting and tracking objects. In automotive applications, radar antennas can include a two-dimensional (2D) array of elements to measure an azimuth angle and elevation angle associated with the objects. The resolution of these azimuth and elevation angles is generally proportional to the aperture size of the array. Realizing a large aperture with a 2D array may require many antenna elements, which increases cost. It is desirable to maintain the angular resolution of radar systems without adding additional antenna elements and without increasing cost.

SUMMARY

This document describes techniques and systems of a radar system with modified orthogonal linear antenna subarrays. Even with far fewer antenna elements than a traditional radar system, these modified subarrays enable an example radar system to have comparable angular resolution at a lower cost and lower complexity level. For example, a radar system includes a processor and an antenna that can receive electromagnetic energy reflected by one or more objects. The antenna includes a first one-dimensional (1D) (e.g., linear) subarray, a second 1D subarray, and a two-dimensional (2D) subarray. The second 1D subarray is positioned orthogonal to the first 1D subarray. The 2D subarray includes at least four antenna elements not encompassed by the first 1D subarray or the second 1D subarray. The processor can determine, using electromagnetic energy received by the first 1D subarray and the second 1D subarray, first and second angles associated with the one or more objects. The processor then associates, using electromagnetic energy received by the 2D subarray, the first angles and the second angles with respective objects of the one or more objects.

This document also describes methods performed by the above-summarized system and other configurations of the radar system set forth herein, as well as means for performing these methods.

This Summary introduces simplified concepts related to a radar system with modified orthogonal linear antenna subarrays, which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a radar system with modified orthogonal linear antenna subarrays are described in this document with reference to the following figures. The same numbers are often used throughout the drawings to reference like features and components.

DETAILED DESCRIPTION

Overview

Radar systems are an important sensing technology that some automotive systems rely on to acquire information about the surrounding environment. Radar systems generally include at least two antennas to transmit and receive EM radiation. Some radar systems include a receive antenna with a two-dimensional (2D) planar array of antenna elements to measure both the azimuth angle and the elevation angle associated with objects. A large aperture in the azimuth direction and the elevation direction of the receive antenna can increase the number of antenna elements and the cost of the radar system.

Some radar systems include a receive antenna with a two-dimensional (2D) planar array of antenna elements to measure both the azimuth angle and the elevation angle of objects. In radar systems with a 2D planar antenna array, the radar system can estimate the angular position of objects using digital beamforming. In digital beamforming, the radar system characterizes the angular information of the object by analyzing the relative phase across the antenna elements of the 2D planar array using a 2D fast Fourier transform (FFT). The angular resolution of such radar systems generally depends on the aperture size of the 2D planar array. A larger aperture size can improve the angular resolution but requires additional antenna elements and increased costs.

Other radar systems include a receive antenna with two orthogonal linear arrays of antenna elements to occupy the azimuth direction and elevation direction of the antenna array. The radar system can use the azimuth linear array and the elevation linear array to measure the azimuth and elevation angles of objects, respectively. These radar systems use matching algorithms to associate the azimuth angle and elevation angle for each object. Although such systems generally include fewer antenna elements than planar 2D arrays, the angle finding for these systems is too complicated for many applications, including automotive applications. In particular, the radar systems use cross-correlation matrix-based methods that require multiple data snapshots from the linear array to associate a single set of angle measurements. Because automotive radar systems generate a single snapshot while a vehicle moves, such methods are inapplicable to automotive applications.

Some other radar systems with orthogonal linear arrays use frequency-modulated continuous-wave signals. These radar systems use a beam-matching method to associate an azimuth angle and an elevation angle. The beam-matching method converts the beam-matching problem to an image-patch matching problem in a range-Doppler domain. This method, however, can only work for applications where only a single object exists in any given range-Doppler bin. If two objects are in the same range-Doppler bin, these radar systems are generally unable to accurately pair the azimuth angle and elevation angle for the respective objects. This inability to accurately associate the azimuth angles and elevation angles restricts these radar systems from automotive radar applications in which multiple objects can often exist in the same range-Doppler bin.

In contrast, this document describes techniques and systems to provide a receive antenna with orthogonal one-dimensional (1D) subarrays and a 2D subarray, for supporting angle finding features. For example, a radar system can include an antenna array with a first 1D subarray, a second 1D subarray, and a 2D subarray. The second 1D subarray is positioned orthogonal to the first 1D subarray. The 2D subarray includes at least four antenna elements not encompassed by the first or second 1D subarrays. In this way, the described systems and techniques can reduce the number of antenna elements while preserving the angular resolution that can otherwise be achieved using a rectangular 2D array with similar aperture sizing.

The radar system determines, using EM energy received by the first and second 1D subarrays, first and second angles, respectively, associated with one or more nearby objects. The radar system can then associate, using EM energy received by the 2D subarray, the first and second angles with respective objects of the one or more objects. In this way, the computational complexity for the described radar system to associate the first angles and second angles to respective objects is similar to the computational complexity for a conventional radar system with conventional 2D planar arrays. The described angle-finding technique can be applied to various configurations of the described orthogonal 1D subarrays with a 2D subarray.

This is just one example of the described techniques and systems of a radar antenna with modified orthogonal linear arrays. This document describes other examples and implementations.

Operating Environment

Figure 1:
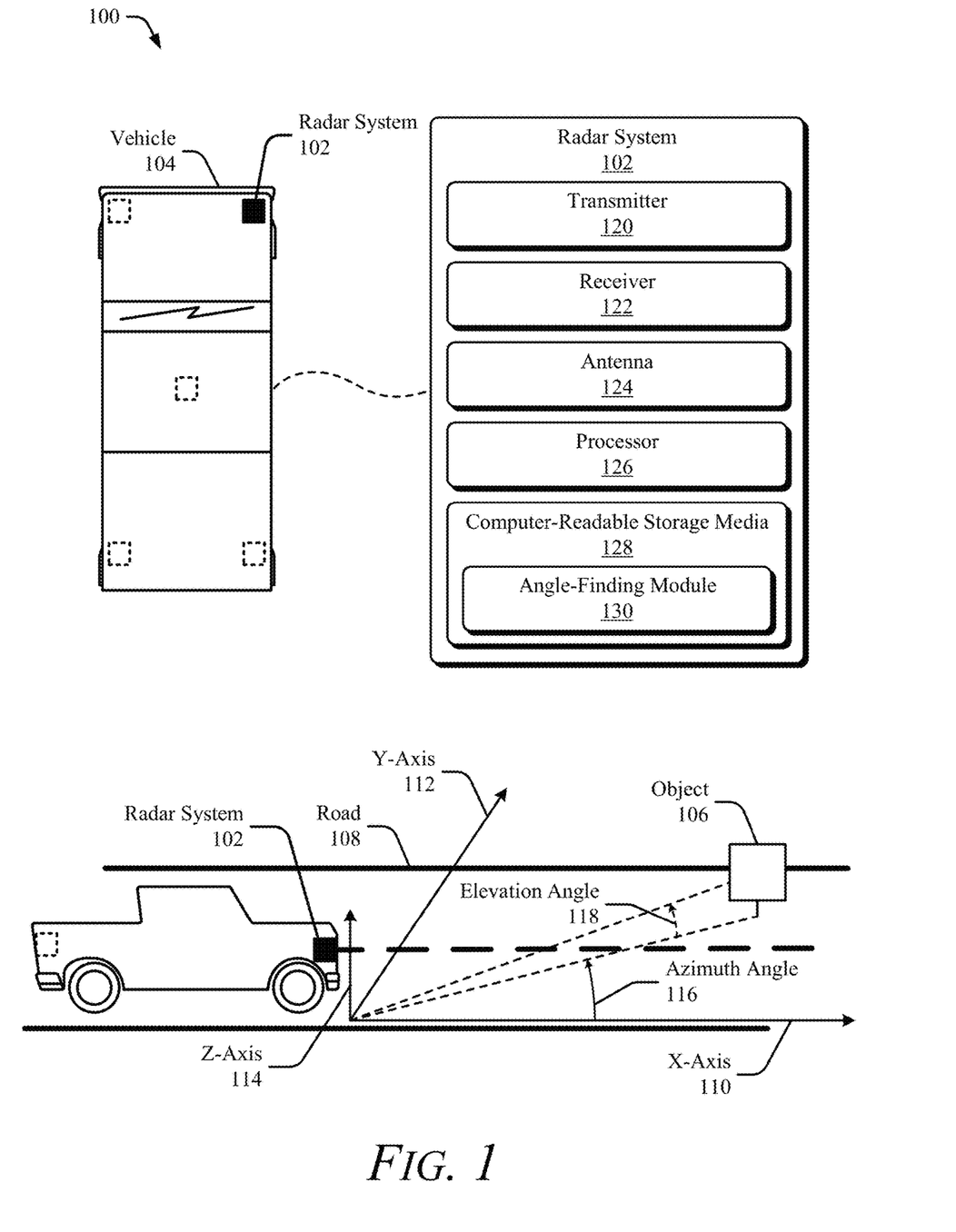
FIG. 1 illustrates an example environment in which a radar system with modified orthogonal linear antenna subarrays can be implemented.

FIG. 1 illustrates an example environment 100 in which a radar system 102 with modified orthogonal linear antenna subarrays can be implemented. In the depicted environment 100, the radar system 102 is mounted to, or integrated within, a vehicle 104. The radar system 102 can detect one or more objects 106 that are in the vicinity of the vehicle 104. Although illustrated as a car, the vehicle 104 can represent other types of motorized vehicles (e.g., a motorcycle, a bus, a tractor, a semi-trailer truck), non-motorized vehicles (e.g., a bicycle), railed vehicles (e.g., a train), watercraft (e.g., a boat), aircraft (e.g., an airplane), or spacecraft (e.g., satellite). In general, manufacturers can mount the radar system 102 to any moving platform, including moving machinery or robotic equipment.

In the depicted implementation, the radar system 102 is mounted on the front of the vehicle 104 and illuminates the object 106. The radar system 102 can detect the object 106 from any exterior surface of the vehicle 104. For example, vehicle manufacturers can integrate the radar system 102 into a bumper, side mirror, headlights, rear lights, or any other interior or exterior location where the object 106 requires detection. In some cases, the vehicle 104 includes multiple radar systems 102, such as a first radar system 102 and a second radar system 102, that provide a larger field-of-view. In general, vehicle manufacturers can design the locations of the one or more radar systems 102 to provide a particular field-of-view that encompasses a region of interest. Example fields-of-view include a 360-degree field-of-view, one or more 180-degree fields-of-view, one or more 90-degree fields-of-view, and so forth, which can overlap or be combined into a field-of-view of a particular size.

The object 106 is composed of one or more materials that reflect radar signals. Depending on the application, the object 106 can represent a target of interest. In some cases, the object 106 can be a moving object (e.g., another vehicle) or a stationary object (e.g., a roadside sign).

The radar system 102 emits EM radiation by transmitting EM signals or waveforms via antenna elements. In the environment 100, the radar system 102 can detect and track the object 106 by transmitting and receiving one or more radar signals. For example, the radar system 102 can transmit EM signals between 100 and 400 gigahertz (GHz), between 4 and 100 GHz, or between approximately 70 and 80 GHz.

The radar system 102 can include a transmitter 120 and at least one antenna 124 to transmit EM signals. The radar system 102 can also include a receiver 122 and the at least one antenna 124 to receive reflected versions of the EM signals. The transmitter 120 includes one or more components for emitting the EM signals. The receiver 122 includes one or more components for detecting the reflected EM signals. The transmitter 120 and the receiver 122 can be incorporated together on the same integrated circuit (e.g., a transceiver integrated circuit) or separately on different integrated circuits.

The radar system 102 also includes one or more processors 126 (e.g., an energy processing unit) and computer-readable storage media (CRM) 128. The processor 126 can be a microprocessor or a system-on-chip. The processor 126 can execute instructions stored in the CRM 128. For example, the processor 126 can process EM energy received by the antenna 124 and determine, using an angle-finding module 130, a location of the object 106 relative to the radar system 102. The processor 126 can also generate radar data for at least one automotive system. For example, the processor 126 can control, based on processed EM energy from the antenna 124, an autonomous or semi-autonomous driving system of the vehicle 104.

The angle-finding module 130 obtains EM energy received by the antenna 124 and determines azimuth angles and elevation angles associated with the object 106. The angle-finding module 130 can be implemented as instructions in the CRM 128, hardware, software, or a combination thereof that is executed by the processor 126.

The radar system 102 can determine a distance to the object 106 based on the time it takes for the EM signals to travel from the radar system 102 to the object 106, and from the object 106 back to the radar system 102. The radar system 102 can also determine, using the angle-finding module 130, a location of the object 106 in terms of an azimuth angle 116 and an elevation angle 118 based on the direction of a maximum-amplitude echo signal received by the radar system 102.

As an example, FIG. 1 illustrates the vehicle 104 traveling on a road 108. The radar system 102 detects the object 106 in front of the vehicle 104. The radar system 102 can define a coordinate system with an x-axis 110 (e.g., in a forward direction along the road 108), a y-axis 112 (e.g., perpendicular to the x-axis 110 and along a surface of the road 108), and a z-axis 114 (e.g., perpendicular to the surface of the road 108). The radar system 102 can locate the object 106 in terms of the azimuth angle 116 and the elevation angle 118. The azimuth angle 116 can represent a horizontal angle from the x-axis 110 to the object 106. The elevation angle 118 can represent a vertical angle from the surface of the road 108 (e.g., a plane defined by the x-axis 110 and the y-axis 112) to the object 106.

The vehicle 104 can also include at least one automotive system that relies on data from the radar system 102, such as a driver-assistance system, an autonomous-driving system, or a semi-autonomous-driving system. The radar system 102 can include an interface to an automotive system that relies on the data. For example, the processor 126 outputs, via the interface, a signal based on EM energy received by the antenna 124.

Generally, the automotive systems use radar data provided by the radar system 102 to perform a function. For example, the driver-assistance system can provide blind-spot monitoring and generate an alert that indicates a potential collision with the object 106 that is detected by the radar system 102. In such an implementation, the radar data from the radar system 102 indicates when it is safe or unsafe to change lanes. The autonomous-driving system may move the vehicle 104 to a particular location on the road 108 while avoiding collisions with the object 106 detected by the radar system 102. The radar data provided by the radar system 102 can provide information about a distance to and the location of the object 106 to enable the autonomous-driving system to perform emergency braking, perform a lane change, or adjust the speed of the vehicle 104.

FIGS. 2A-2F illustrate example antennas 200 with modified orthogonal linear antenna subarrays. The antennas 200 are examples of the antenna 124 of the radar system 102 in FIG. 1, with similar components. The antennas 200 include a first 1D subarray 204 (e.g., an azimuth subarray), a second 1D subarray 206 (e.g., an elevation subarray), and a 2D subarray 208 on a printed circuit board (PCB) 202. In operation, the antennas 200 can receive EM energy reflected by one or more objects 106.

In the depicted implementations, the first antenna subarray 204 is positioned in an azimuth direction and is hereinafter referred to as the azimuth subarray 204. The second antenna subarray 206 is positioned in an elevation direction and is hereinafter referred to as the elevation subarray 206. The elevation subarray 206 is positioned orthogonal to the azimuth subarray 204. The azimuth subarray 204 and the elevation subarray 206 can be linear subarrays.

Figure 2A:
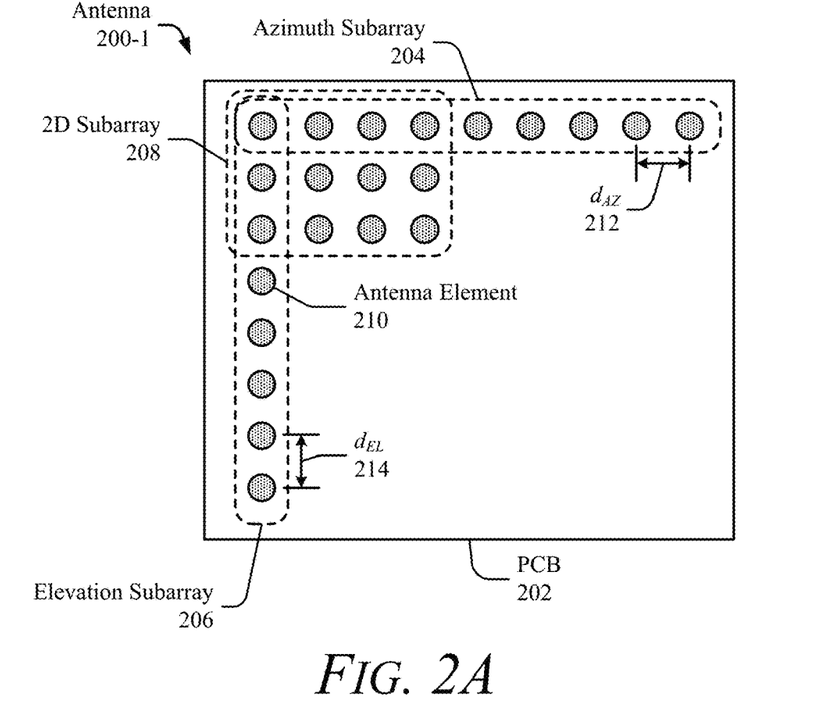
FIGS. 2A-2F illustrate example antennas with modified orthogonal linear antenna subarrays.
Figure 2B:
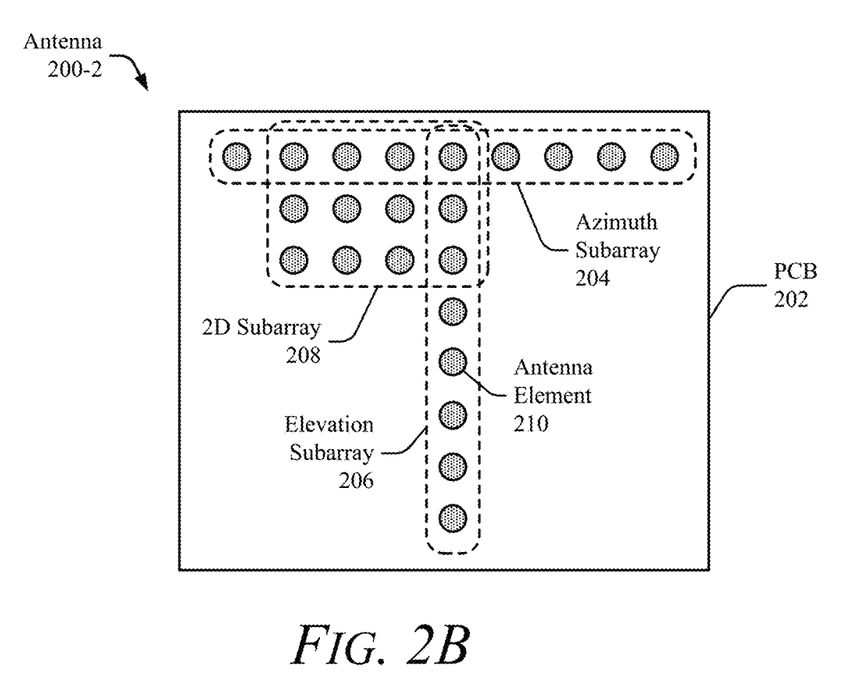
Figure 2C:
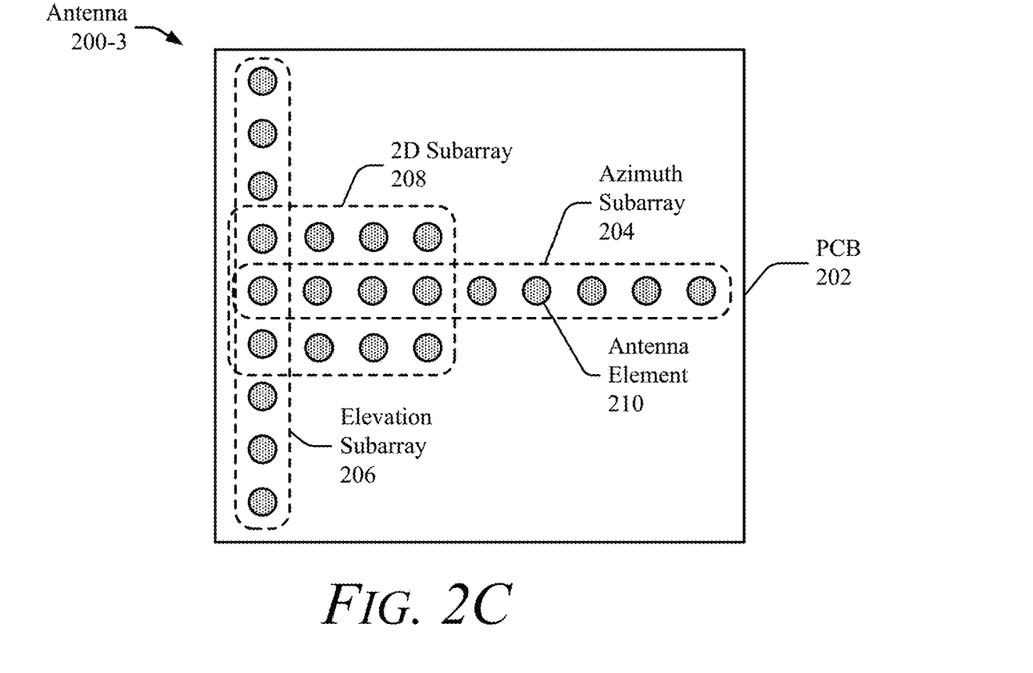
Figure 2D:
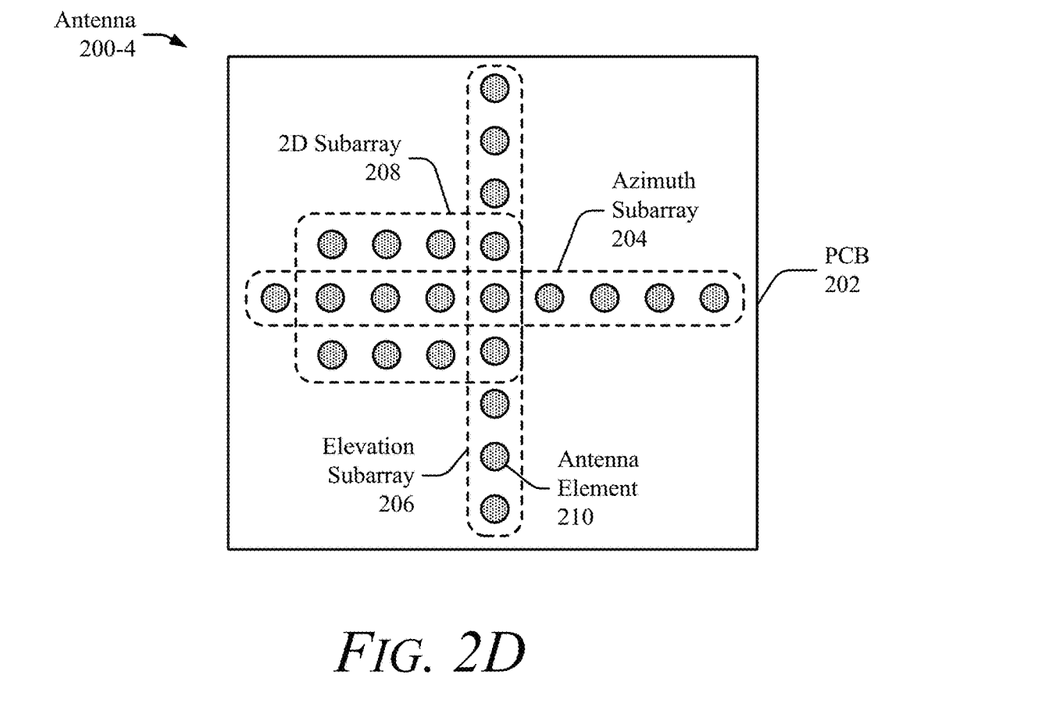
Figure 2E:
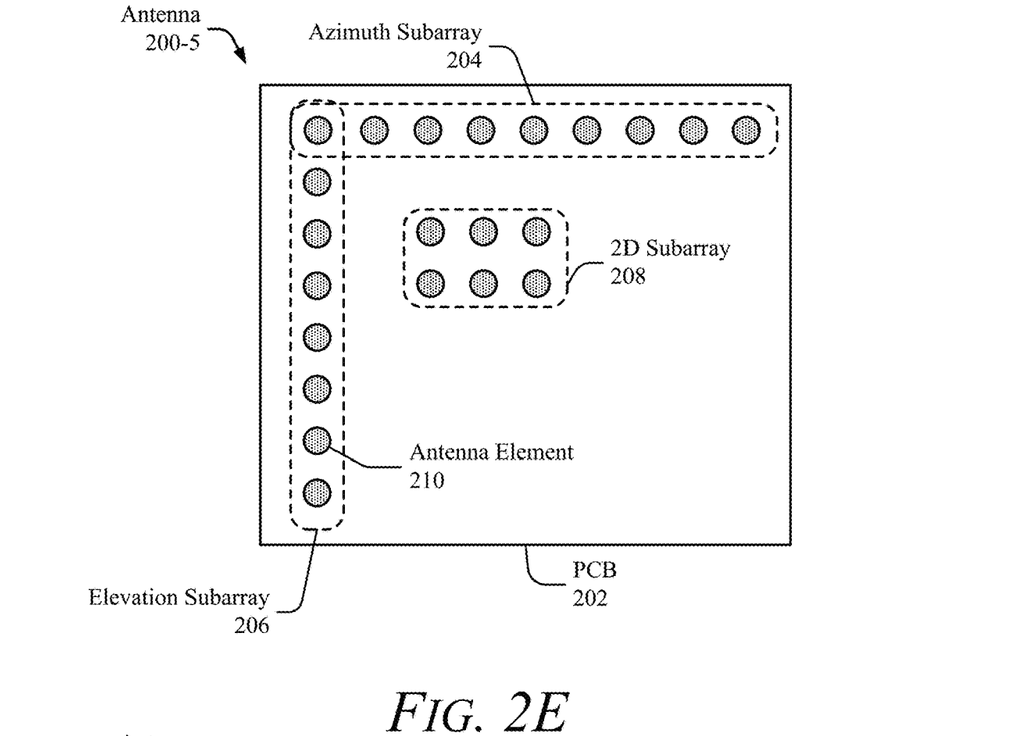
Figure 2F:
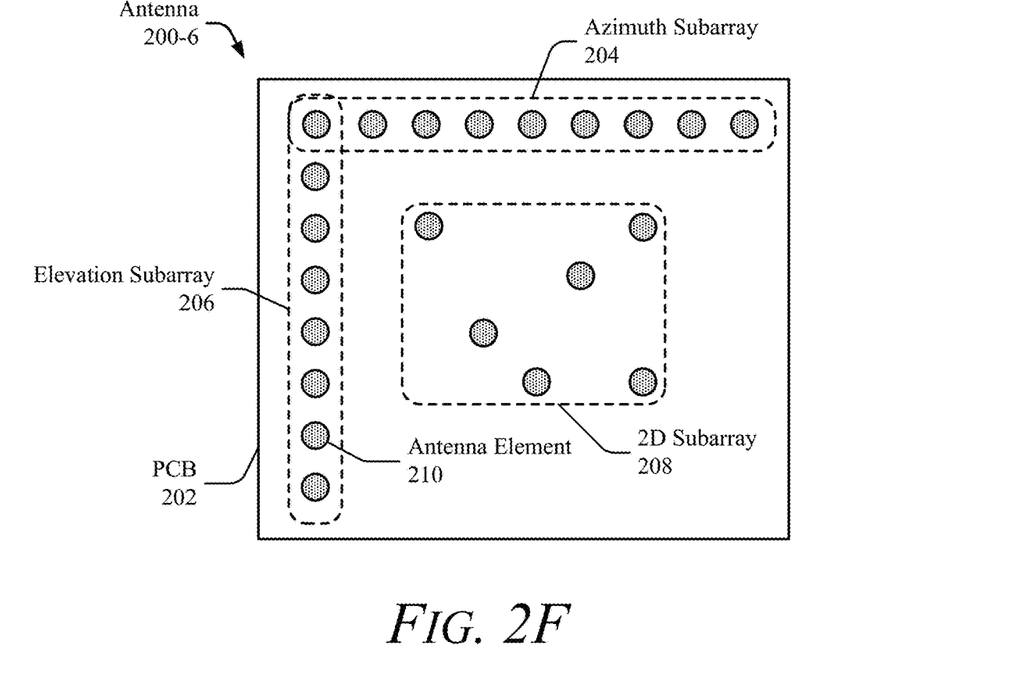

The azimuth subarray 204 and the elevation subarray 206 can be arranged in an approximately L shape, as illustrated in FIGS. 2A, 2E, and 2F; an approximately T shape, as illustrated in FIGS. 2B and 2C; or an approximately cross shape, as illustrated in FIG. 2D. Radar designers or radar manufacturers can arrange the antenna elements of the azimuth subarray 204 and the elevation subarray 206 in other approximate shapes with the elevation subarray 206 positioned orthogonal to the azimuth subarray 204.

The antenna elements 210 of the 2D subarray 208 can be arranged in an approximately rectangular shape, as illustrated in FIGS. 2A-2E. These antenna elements 210 can be positioned close to (e.g., as illustrated in FIGS. 2A and 2B), overlapping with (e.g., as illustrated in FIGS. 2C and 2D), or separated from (e.g., as illustrated in FIGS. 2E and 2F) the azimuth subarray 204 and/or the elevation subarray 206. The antenna elements 210 of the 2D subarray 208 can also be arranged in a two-dimensional sparse array, as illustrated in FIG. 2F. The specific arrangement of the azimuth subarray 204, the elevation subarray 206, and the 2D subarray 208 can be chosen based on the position and arrangement of other components in the radar system 102.

The azimuth subarray 204, the elevation subarray 206, and the 2D subarray 208 include multiple antenna elements 210. The azimuth subarray 204 can include M antenna elements 210. The elevation subarray 206 can include N antenna elements 210, where N is equal or not equal to M. The 2D subarray 208 can include P antenna elements 210 not encompassed by the azimuth subarray 204 or the elevation subarray 206. In automotive applications, the number of antenna elements 210 in the 2D subarray 208 can be greater than an anticipated maximum number of objects 106 to be detected by the radar system 102. The number of antenna elements 210 in the 2D subarray, P, is generally less than the product of M and N (e.g., P<<M×N). In some implementations, P is less than half of the product of M and N (e.g., $$\left(\text{e.g., } P < \frac{M \times N}{2}\right).$$

The total number of antenna elements 210 in the antenna 200 generally equals M+N+P−1, where one antenna element 210 is shared by the azimuth subarray 204 and the elevation subarray 206. The number of antenna elements 210 in the antenna 200 (e.g., $$(\text{e.g., } M + N + P - 1)$$

is generally much less than the number of antenna elements 210 in a rectangular array (e.g., $$(\text{e.g., } M \times N)$$

with the same aperture sizing.

In the depicted implementations, the azimuth subarray 204 includes nine antenna elements 210, the elevation subarray 206 includes eight antenna elements 210, and the 2D subarray 208 includes six antenna elements 210 not encompassed by the azimuth subarray 204 or the elevation subarray 206. The antennas 200 include 22 antenna elements 210, much less than 72 antenna elements included in a rectangular array with the same aperture sizing. In other implementations, the azimuth subarray 204, the elevation subarray 206, or the 2D subarray 208 can include fewer or additional antenna elements 210. The 2D subarray 208 generally includes at least four antenna elements 210 not encompassed by the azimuth subarray 204 or the elevation subarray 206.

The antenna elements 210 in the azimuth subarray 204 and the 2D subarray 208 are separated by an azimuth distance 212, $d_{AZ}$. Similarly, the antenna elements 210 in the elevation subarray 204 and the 2D subarray 208 are separated by an elevation distance 214, $d_{EL}$. As described with respect to FIG. 5, the angle-finding module 130 uses the azimuth distance 212 and the elevation distance 214 to associate an elevation angle to an azimuth angle for the object 106.

The azimuth subarray 204, the elevation subarray 206, and the 2D subarray 208 can be planar arrays that provide high gain and low loss. Planar arrays are well-suited for vehicle integration due to their small size. For example, the antenna elements 210 can be slots etched or otherwise formed in a plating material of one surface of the PCB 202 for a substrate-integrated waveguide (SIW) antenna. The antenna elements 210 can also be part of an aperture antenna, a microstrip antenna, or a dipole antenna. For example, the azimuth subarray 204, the elevation subarray 206, and the 2D subarray 208 can include subarrays of patch elements (e.g., microstrip patch antenna subarrays) or dipole elements.

Figure 3:
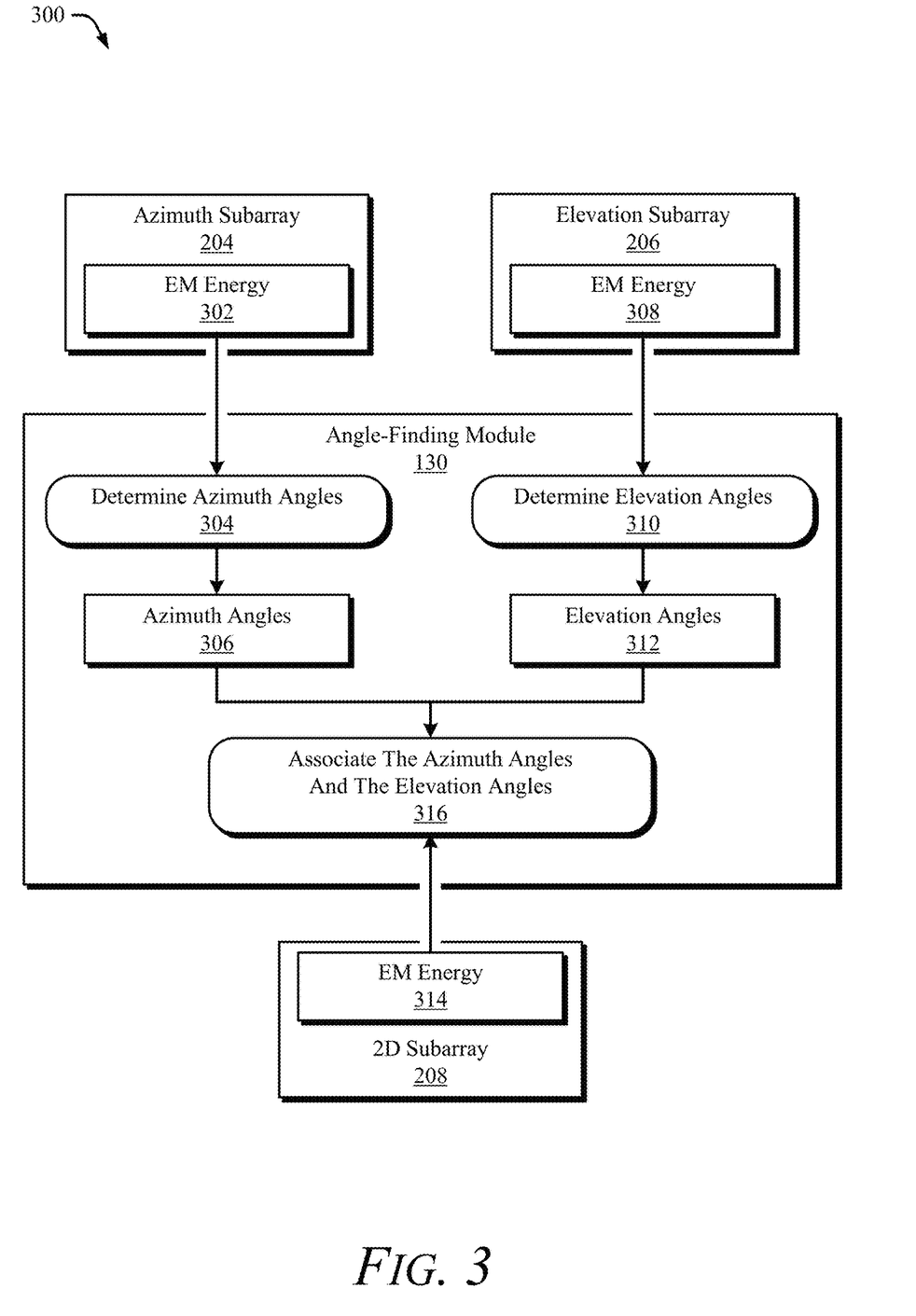
FIG. 3 illustrates an example flow diagram of a radar system with modified orthogonal linear antenna subarrays.

FIG. 3 illustrates an example flow diagram 300 of the radar system 102 with modified orthogonal linear antenna subarrays and the angle-finding module 130. The radar system 102 of FIG. 3 can, for example, be the radar system 102 of FIG. 1. The radar system 102 includes two 1D subarrays positioned orthogonal to one another, along with a 2D subarray. In the depicted implementation, the radar system 102 includes the azimuth subarray 204, the elevation subarray 206, and the 2D subarray of antenna 200, which can be arranged in a variety of positions, including the arrangements illustrated in FIGS. 2A-2F.

At 304, the angle-finding module 130 obtains EM energy 302 received by the azimuth subarray 204 and determines azimuth angles 306 associated with one or more azimuth objects. The azimuth angles 306 include $\theta_1, \theta_2, \ldots, \theta_{N_{AZ}}$, where $N_{AZ}$ represents the number of azimuth objects.

At 310, the angle-finding module 130 obtains EM energy 308 received by the elevation subarray 206 and determines elevation angles 312 associated with one or more elevation objects. The elevation angles 312 include $\varphi_1, \varphi_2, \ldots, \varphi_{N_{EL}}$, where $N_{EL}$ represents the number of elevation objects. Because two or more of the objects 106 can have the same azimuth angles 306 and/or the same elevation angles 312, the number of elevation objects, $N_{EL}$, can be different than the number of azimuth objects, $N_{AZ}$. For example, the radar system 102 can detect three objects 106 (e.g., three vehicles in front of the vehicle 104), each of which can have the same elevation angle 312 relative to the radar system 102 but different azimuth angles 306. As a result, the angle-finding module 130 would identify one elevation object but three azimuth objects.

The angle-finding module 130 can use various angle-finding functions to determine the azimuth angles 306 and the elevation angles 312 from the EM energy 302 and the EM energy 308, respectively. As non-limiting examples, the angle-finding module 130 can use a pseudo-spectrum function, including a Space-Alternating Generalized Expectation-maximization (SAGE), Delay-and-Sum (DS), Minimum Variance Distortionless Response (MVDR), and/or a Multiple Signal Classification (MUSIC) based-function, to calculate the direction of arrival of the EM signals received by the azimuth subarray 206 and the elevation subarray 208. As another example, the angle-finding module can use an Estimation of Signal Parameters via Rotational Invariance Technique (ESPRIT) technique or FFT beamforming to calculate the azimuth angles 306 and the elevation angles 312. The angle-finding module 130 can determine the azimuth angles 306 and the elevation angles 312 with relatively low processing complexity and cost.

At 316, the angle-finding module 130 associates, using EM energy 314 received by the 2D subarray 208, the azimuth angles 306 and the elevation angles 312 to the objects 106. In particular, the angle-finding module 130 determines the azimuth angle 306 and the elevation angle 312 associated with each of the one or more objects 106. The association of the azimuth angles 306 to the elevation angles 312 is described in greater detail with respect to FIG. 4.

Figure 4:
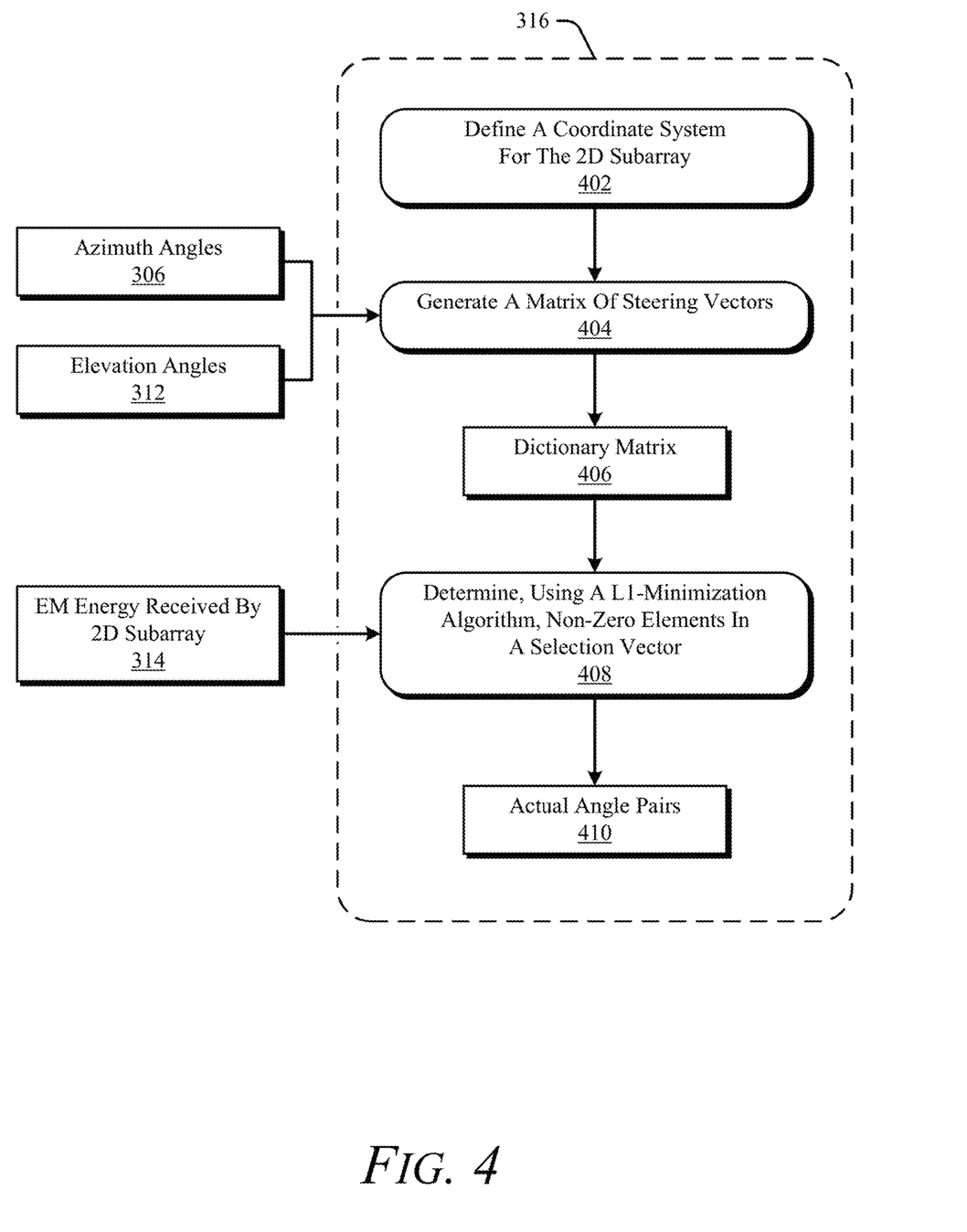
FIG. 4 illustrates an example flow diagram of an angle-finding module to associate azimuth angles and elevation angles to respective objects.

FIG. 4 illustrates an example flow diagram 316 of the angle-finding module 130 to associate the azimuth angles 306 and the elevation angles 312 to respective objects 106. The angle-finding module 130 of FIG. 4 can, for example, be the angle-finding module 130 of FIGS. 1-3. As described with respect to FIG. 3, the angle-finding module 130 determines the azimuth angles 306 and the elevation angles 312 associated with the azimuth objects and the elevation objects, respectively.

At 402, the angle-finding module 130 can define a coordinate system for the antenna elements 210 of the 2D subarray 208. For example, the angle-finding module 130 can denote the coordinate of the most bottom-left antenna element 210 of the 2D subarray 208 in antenna 200-1 as (0, 0). The coordinates of the other antenna elements 210 in the 2D subarray 208 can be denoted as $$(d_{AZ}^{(1)}, d_{EL}^{(1)}),$$

$$(d_{AZ}^{(2)}, d_{EL}^{(2)}),$$

$$(d_{AZ}^{(K-1)}, d_{EL}^{(K-1)}),$$

where K represents the total number of antenna elements 210 in the 2D subarray and $d_{AZ}$ and $d_{EL}^{(i-1)}$ represents the azimuth distance 212 and the elevation distance 214 from the ith antenna element 210 to the most bottom-left antenna element 210, respectively.

At 404, the angle-finding module 130 can generate, using the coordinate system, a dictionary matrix 406 of steering vectors that include each of the azimuth angles 306 paired with each of the elevation angles 312. If a pair of an azimuth angle 306 and an elevation angle 312 of a point scatterer is given as $(\theta, \varphi)$, the angle-finding module 130 can generate a K×1 steering vector:

$$a(\theta, \varphi) = \left[1, e^{-j2\pi(d_{az}^{(1)}\sin\theta + d_{el}^{(1)}\sin\varphi)/\lambda}, \right. \quad (1)$$
$$\left. e^{-j2\pi(d_{az}^{(2)}\sin\theta + d_{el}^{(2)}\sin\varphi)/\lambda}, \ldots, e^{-j2\pi(d_{az}^{(K-1)}\sin\theta + d_{el}^{(K-1)}\sin\varphi)/\lambda}\right]^T$$

where $\lambda$ represents the wavelength of the EM signal transmitted and received by the radar system 102.

The angle-finding module 130 can use the azimuth angles 306, $\theta_1, \theta_2, \ldots, \theta_{N_{AZ}}$, and the elevation angles 312, $\varphi_1, \varphi_2, \ldots, \varphi_{N_{EL}}$, to form $N_{AZ}N_{EL}$ angle pairs. The angles of the objects 106 are included within the $N_{AZ}N_{EL}$ angle pairs.

For each angle pair $(\theta_u, \varphi_v)$, where $u \in \{1, 2, \ldots, N_{AZ}\}$ and $v \in \{1, 2, \ldots, N_{EL}\}$, the angle-finding module 130 can define a steering vector for the 2D subarray 208 as:

$$a(\theta_u, \varphi_v) = \quad (2)$$
$$\left[1, e^{-j2\pi(d_{AZ}^{(1)}\sin\theta_u + d_{EL}^{(1)}\sin\varphi_v)/\lambda}, \ldots, e^{-j2\pi(d_{AZ}^{(K-1)}\sin\theta_u + d_{EL}^{(K-1)}\sin\varphi_v)/\lambda}\right]^T$$

The angle-finding module 130 can assemble the steering vectors for the angle pairs into the $K \times N_{AZ}N_{EL}$ dictionary matrix 406:

$$A = \left[a(\theta_{u_1}, \varphi_{v_1}), a(\theta_{u_2}, \varphi_{v_2}), \ldots, a(\theta_{u_{N_{AZ}N_{EL}}}, \varphi_{v_{N_{AZ}N_{EL}}})\right] \quad (3)$$

At 408, the angle-finding module 130 can determine, using an L1-minimization based-function and the EM energy 314 received by the 2D subarray 208, non-zero elements in a selection vector. The non-zero elements in the selection vector represent actual angle pairs 410 of the dictionary matrix 406 that correspond to the azimuth angle 306 and the elevation angle 312 of the respective objects 106.

Because the actual pairs 410 of the objects 106 should be within the $N_{AZ}N_{EL}$ angle pairs, the angle-finding module 130 can use the following equation to identify the actual pairs 410:

$$y = Ax + \eta \quad (4)$$

where the K×1 vector y represents the measured beam vector of the EM energy 314 received by the 2D subarray 208, the $N_{AZ}N_{EL}\times 1$ vector x represents a parse vector, and the K×1 vector q represents measurement noise. The angle-finding module 130 considers x as the selection vector. The steering vectors in A corresponding to the non-zero elements in x represent the actual pairs 410.

The angle-finding module 130 can solve for the x in Equation (4) by solving the following L1-minimization:

$$\hat{x} = \underset{x}{\operatorname{argmin}} \|x\|_1, \text{ s.t. } \|y - Ax\|_2 \le \varepsilon \quad (5)$$

where ε bounds the amount of noise in the data. The angle-finding module 130 can solve Equation (5) using, for example, an Orthogonal Matching Pursuit (OMP) based-function.

Example Method

Figure 5:
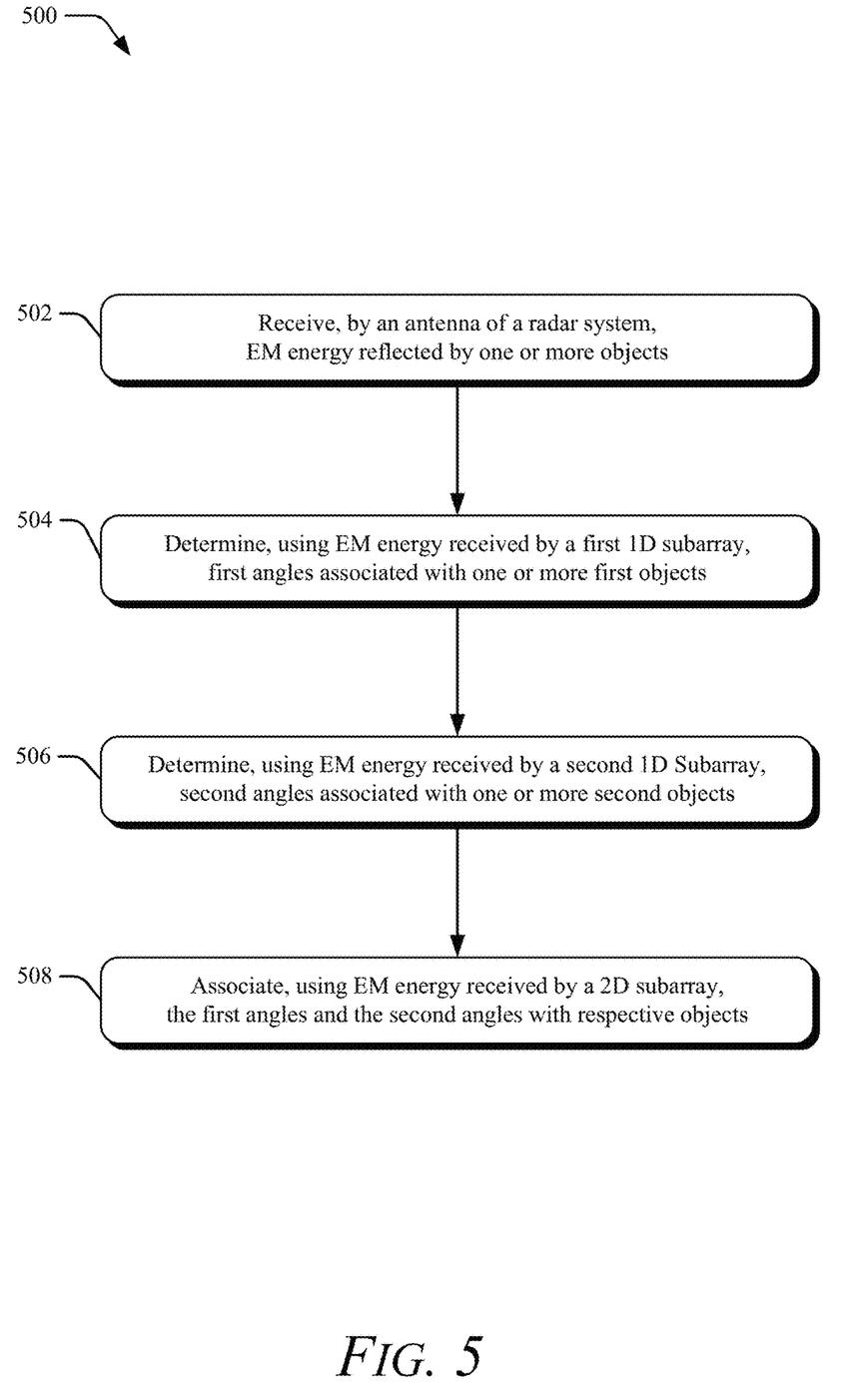
FIG. 5 illustrates an example method of a radar system with modified orthogonal linear antenna subarrays and an angle-finding module.

FIG. 5 illustrates an example method 500 of the radar system 102 with modified orthogonal linear antenna subarrays and the angle-finding module 130. Method 500 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1, and entities detailed in FIGS. 1 through 4, reference to which is made for example only. The techniques are not limited to performance by one entity or multiple entities.

At 502, an antenna of a radar system receives EM energy reflected by one or more objects. For example, the antenna 200 of the radar system 102 can receive EM energy reflected by the one or more objects 106.

At 504, first angles associated with one or more first objects are determined using EM energy received by a first 1D subarray of the antenna. The one or more first objects are a first subset of the one or more objects. For example, the processor 126 of the radar system 102 can determine, using the angle-finding module 130 and the EM energy 302 received by the azimuth subarray 204, the azimuth angles 306 associated with one or more azimuth objects. The one or more azimuth objects are a first subset of the one or more objects 106.

At 506, second angles associated with one or more second objects are determined using EM energy received by a second 1D subarray of the antenna. The one or more second objects are a second subset of the one or more objects. The second 1D subarray is positioned orthogonal to the first 1D subarray. For example, the processor 126 can determine, using the angle-finding module 130 and the EM energy 308 received by the elevation subarray 206, the elevation angles 312 associated with one or more elevation objects. The one or more elevation objects are a second subset of the one or more objects 106. The elevation subarray 206 is positioned orthogonal to the azimuth subarray 204.

At 508, the first angles and the second angles are associated with respective objects of the one or more objects using EM energy received by a 2D subarray. The 2D subarray includes at least four antenna elements not encompassed by the first 1D subarray or the second 1D subarray. For example, the processor 126 can associate, using the angle-finding module 130 and the EM energy 314 received by the 2D subarray 208, the azimuth angles 306 and the elevation angles 312 with respective objects of the one or more objects 106. The 2D subarray 208 includes at least four antenna elements 210 that are not encompassed by the azimuth subarray 204 and the elevation subarray 206.

EXAMPLES

In the following section, examples are provided.

Example 1: A radar system comprising: an antenna configured to receive electromagnetic (EM) energy reflected by one or more objects, the antenna comprising: a first one-dimensional subarray; a second one-dimensional subarray positioned orthogonal to the first one-dimensional subarray; and a two-dimensional subarray comprising at least four antenna elements not encompassed by the first one-dimensional subarray or the second one-dimensional subarray; and one or more processors configured to: determine, using the EM energy received by the first one-dimensional subarray, first angles associated with one or more first objects, the one or more first objects comprising a first subset of the one or more objects; determine, using the EM energy received by the second one-dimensional subarray, second angles associated with one or more second objects, the one or more second objects comprising a second subset of the one or more objects; and associate, using the EM energy received by the two-dimensional subarray, the first angles and the second angles with respective objects of the one or more objects.

Example 2: The radar system of example 1, wherein the one or more processors are configured to associate the first angles and the second angles with the respective objects of the one or more objects in the following manner: define a coordinate system for the antenna elements of the two-dimensional subarray; generate, using the coordinate system, a dictionary matrix of steering vectors that include each of the first angles paired with each of the second angles; and determine, using an L1-minimization based-function and the EM energy received by the two-dimensional subarray, non-zero elements in a selection vector, the non-zero elements in the selection vector representing pairs of the first angle and the second angle in the dictionary matrix that correspond to the first angles and the second angles of the respective objects of the one or more objects.

Example 3: The radar system of example 1, wherein the first one-dimensional subarray is positioned in an azimuth direction and the second one-dimensional subarray is positioned in an elevation direction.

Example 4: The radar system of example 1, wherein the first one-dimensional subarray and the second one-dimensional subarray are linear subarrays.

Example 5: The radar system of example 4, wherein the first one-dimensional subarray and the second one-dimensional subarray are configured in an approximately L-shape, an approximately T-shape, or an approximately cross shape.

Example 6: The radar system of example 1, wherein the first one-dimensional subarray comprises a first number of antenna elements and the second one-dimensional subarray comprises a second number of antenna elements, the first number of antenna elements not equal to the second number of antenna elements.

Example 7: The radar system of example 6, wherein the two-dimensional subarray comprises a third number of antenna elements, the third number of antenna elements is less than a half of a product of the first number of antenna elements and the second number of antenna elements.

Example 8: The radar system of example 1, wherein the antenna elements of the two-dimensional subarray are configured in an approximately rectangular shape.

Example 9: The radar system of example 1, wherein the antenna elements of the two-dimensional subarray are positioned in a sparse array.

Example 10: The radar system of example 1, wherein the number of antenna elements in the two-dimensional subarray is greater than an anticipated maximum number of objects of the radar system.

Example 11: The radar system of example 1, wherein the antenna elements of the two-dimensional subarray are not included in the first one-dimensional subarray or the second one-dimensional subarray.

Example 12: The radar system of example 1, wherein the first angles and the second angles are determined using at least one of an Estimation of Signal Parameters via Rotational Invariance Technique (ESPRIT), Space-Alternating Generalized Expectation-maximization (SAGE), Delay-and-Sum (DS), Minimum Variance Distortionless Response (MVDR), a Multiple Signal Classification (MUSIC), or a fast Fourier transform (FFT) beamforming based-function.

Example 13: The radar system of example 1, wherein the radar system is configured to be installed on an automobile.

Example 14: A method comprising: receiving, by an antenna of a radar system, electromagnetic (EM) energy reflected by one or more objects; determining, using the EM energy received by a first one-dimensional subarray of the antenna, first angles associated with one or more first objects, the one or more first objects comprising a first subset of the one or more objects; determining, using the EM energy received by a second one-dimensional subarray of the antenna, second angles associated with one or more second objects, the one or more second objects comprising a second subset of the one or more objects, the second one-dimensional subarray positioned orthogonal to the first one-dimensional subarray; and associating, using the EM energy received by a two-dimensional subarray, the first angles and the second angles with respective objects of the one or more objects, the two-dimensional subarray comprising at least four antenna elements not encompassed by the first one-dimensional subarray or the second one-dimensional subarray.

Example 15: The method of example 14, wherein associating the first angles and the second angles with the respective objects of the one or more objects comprises: defining a coordinate system for the antenna elements of the two-dimensional subarray; generating, using the coordinate system, a dictionary matrix of steering vectors that include each of the first angles paired with each of the second angles; and determining, using an L1-minimization based-function and the EM energy received by the two-dimensional subarray, non-zero elements in a selection vector, the non-zero elements in the selection vector representing pairs of the first angle and the second angle in the dictionary matrix that correspond to the first angles and the second angles of the respective objects of the one or more objects.

Example 16: The method of example 14, wherein the first one-dimensional subarray is positioned in an azimuth direction, and the second one-dimensional subarray is positioned in an elevation direction.

Example 17: The method of example 14, the antenna elements of the two-dimensional subarray are positioned in a sparse array.

Example 18: A computer-readable storage media comprising computer-executable instructions that, when executed, cause a processor of a radar system to: receive, by an antenna of the radar system, electromagnetic (EM) energy reflected by one or more objects; determine, using the EM energy received by a first one-dimensional subarray of the antenna, first angles associated with one or more first objects, the one or more first objects comprising a first subset of the one or more objects; determine, using the EM energy received by a second one-dimensional subarray of the antenna, second angles associated with one or more second objects, the one or more second objects comprising a second subset of the one or more objects, the second one-dimensional subarray positioned orthogonal to the first one-dimensional subarray; and associate, using the EM energy received by a two-dimensional subarray, the first angles and the second angles with respective objects of the one or more objects, the two-dimensional subarray comprising at least four antenna elements not encompassed by the first one-dimensional subarray or the second one-dimensional subarray.

Example 19: The computer-readable storage media of example 18, wherein the computer-executable instructions, to associate the first angles and the second angles with the respective objects, cause the processor of the radar system to: define a coordinate system for the antenna elements of the two-dimensional subarray; generate, using the coordinate system, a dictionary matrix of steering vectors that include each of the first angles paired with each of the second angles; and determine, using an L1-minimization based-function and the EM energy received by the two-dimensional subarray, non-zero elements in a selection vector, the non-zero elements in the selection vector representing pairs of the first angle and the second angle in the dictionary matrix that correspond to the first angles and the second angles of the respective objects of the one or more objects.

Example 20: The computer-readable storage media of example 18, wherein the first one-dimensional subarray is positioned in an azimuth direction and the second one-dimensional subarray is positioned in an elevation direction.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A radar system comprising:
   an antenna configured to receive electromagnetic (EM) energy reflected by one or more objects, the antenna comprising:

a first one-dimensional (1D) subarray comprising a first quantity of antenna elements;
a second 1D subarray positioned orthogonal to the first 1D subarray and comprising a second quantity of antenna elements; and
a two-dimensional (2D) subarray comprising a third quantity of antenna elements that is less than a product of the first quantity and the second quantity; and
one or more processors configured to:
determine, using the EM energy received by the first and second 1D subarrays, first angles and second angles, respectively, associated with the one or more objects; and
determine relative locations of the one or more objects by associating, using the EM energy received by the 2D subarray, respective first angles of the first angles to respective second angles of the second angles.

2. The radar system of claim 1, wherein the first 1D subarray, the second 1D subarray, and the 2D subarray are included on a printed circuit board.

3. The radar system of claim 2, wherein the antenna elements of the first 1D subarray, the second 1D subarray, and the 2D subarray are etched or formed in a plating material of a surface of the printed circuit board.

4. The radar system of claim 1, wherein the antenna elements of the first 1D subarray, the second 1D subarray, and the 2D subarray are patch elements or dipole elements.

5. The radar system of claim 1, wherein the first 1D subarray and the second 1D subarray share an antenna element.

6. The radar system of claim 1, wherein:
the first 1D subarray and the second 1D subarray are arranged in an approximately L-shape; and
the antenna elements of the 2D subarray are arranged in an approximately rectangular shape that has common elements with the antenna elements of the first 1D subarray or the second 1D subarray.

7. The radar system of claim 1, wherein:
the first 1D subarray and the second 1D subarray are arranged in an approximately T-shape; and
the antenna elements of the 2D subarray are arranged in an approximately rectangular shape that has common elements with the antenna elements of the first 1D subarray or the second 1D subarray.

8. The radar system of claim 1, wherein:
the first 1D subarray and the second 1D subarray are arranged in an approximately cross shape; and
the antenna elements of the 2D subarray are arranged in an approximately rectangular shape that has common elements with the antenna elements of the first 1D subarray or the second 1D subarray.

9. The radar system of claim 1, wherein:
each antenna element of the first quantity of antenna elements are separated by a first distance in a first direction;
each antenna element of the second quantity of antenna elements are separated by a second distance in a second direction orthogonal to the first direction;
antenna elements of the third quantity of antenna elements are separated by the first distance in the first direction and by the second distance in the second direction; and
the one or more processors are further configured to associate the respective first angles to the respective second angles using the first distances from the first quantity of antenna elements and the second distances from the second quantity of antenna elements.

10. A method comprising:
receiving, by an antenna of a radar system, electromagnetic (EM) energy reflected by one or more objects;
determining, using the EM energy received by a first one-dimensional (1D) subarray and a second 1D subarray of the antenna, first angles and second angles, respectively, associated with the one or more objects, the first 1D subarray comprising a first quantity of antenna elements, the second 1D subarray positioned orthogonal to the first 1D subarray and comprising a second quantity of antenna elements; and
determining relative locations of the one or more objects by associating, using the EM energy received by a two-dimensional (2D) subarray, respective first angles of the first angles to respective second angles of the second angles, the 2D subarray comprising a third quantity of antenna elements that is less than a product of the first quantity and the second quantity.

11. The method of claim 10, wherein:
each antenna element of the first quantity of antenna elements are separated by a first distance in a first direction;
each antenna element of the second quantity of antenna elements are separated by a second distance in a second direction orthogonal to the first direction;
antenna elements of the third quantity of antenna elements are separated by the first distance in the first direction and by the second distance in the second direction; and
the method further comprises associating the respective first angles to the respective second angles by using the first distances from the first quantity of antenna elements and the second distances from the second quantity of antenna elements.

12. Non-transitory computer-readable storage media comprising computer-executable instructions that, when executed, cause a processor of a radar system to:
receive, by an antenna of a radar system, electromagnetic (EM) energy reflected by one or more objects;
determine, using the EM energy received by a first one-dimensional (1D) subarray and a second 1D subarray of the antenna, first angles and second angles, respectively, associated with the one or more objects, the first 1D subarray comprising a first quantity of antenna elements, the second 1D subarray positioned orthogonal to the first 1D subarray and comprising a second quantity of antenna elements; and
determine relative locations of the one or more objects by associating, using the EM energy received by a two-dimensional (2D) subarray, respective first angles of the first angles to respective second angles of the second angles, the 2D subarray comprising a third quantity of antenna elements that is less than a product of the first quantity and the second quantity.

13. The non-transitory computer-readable storage media of claim 12, wherein the first 1D subarray, the second 1D subarray, and the 2D subarray are included on a printed circuit board.

14. The non-transitory computer-readable storage media of claim 13, wherein the antenna elements of the first 1D subarray, the second 1D subarray, and the 2D subarray are etched or formed in a plating material of a surface of the printed circuit board.

15. The non-transitory computer-readable storage media of claim 12, wherein the antenna elements of the first 1D subarray, the second 1D subarray, and the 2D subarray are patch elements or dipole elements.

16. The non-transitory computer-readable storage media of claim 12, wherein the first 1D subarray and the second 1D subarray share an antenna element.

17. The non-transitory computer-readable storage media of claim 12, wherein:
the first 1D subarray and the second 1D subarray are arranged in an approximately L-shape; and
the antenna elements of the 2D subarray are arranged in an approximately rectangular shape that has common elements with the antenna elements of the first 1D subarray or the second 1D subarray.

18. The non-transitory computer-readable storage media of claim 12, wherein:
the first 1D subarray and the second 1D subarray are arranged in an approximately T-shape; and
the antenna elements of the 2D subarray are arranged in an approximately rectangular shape that has common elements with the antenna elements of the first 1D subarray or the second 1D subarray.

19. The non-transitory computer-readable storage media of claim 12, wherein:
the first 1D subarray and the second 1D subarray are arranged in an approximately cross shape; and
the antenna elements of the 2D subarray are arranged in an approximately rectangular shape that has common elements with the antenna elements of the first 1D subarray or the second 1D subarray.

20. The non-transitory computer-readable storage media of claim 12, wherein:
each antenna element of the first quantity of antenna elements are separated by a first distance in a first direction;
each antenna element of the second quantity of antenna elements are separated by a second distance in a second direction orthogonal to the first direction;
antenna elements of the third quantity of antenna elements are separated by the first distance in the first direction and by the second distance in the second direction; and
the computer-readable storage media comprises further computer-executable instructions that, when executed, cause the processor of the radar system to associate the respective first angles to the respective second angles using the first distances from the first quantity of antenna elements and the second distances from the second quantity of antenna elements.

* * * * *